United States Patent

Romanoff et al.

[11] Patent Number: 5,835,193
[45] Date of Patent: Nov. 10, 1998

[54] COMPENSATION MECHANISM FOR THE ELIMINATION OF MANUAL BACKPAN ON CAMERA CRANES AND JIB ARMS

[76] Inventors: Andrew B. Romanoff, 374 N. Ridgewood Pl., Los Angeles, Calif. 90004; Nicholas Pollacchi, 54 Rue de la Verrerie, Paris, France, 75004

[21] Appl. No.: 878,591

[22] Filed: Jun. 19, 1997

Related U.S. Application Data

[63] Continuation of Ser. No. 476,459, Jun. 7, 1995, Pat. No. 5,644,377.

[51] Int. Cl.$^6$ ..................................................... G03B 17/00
[52] U.S. Cl. ............................ 352/243; 395/428; 395/13; 74/5.34
[58] Field of Search ............................... 352/243; 396/13; 248/349.1, 346, 183, 143, 373, 324, 550, 123.11, 292.11; 74/5.34, 5.22, 5.1

[56] References Cited

U.S. PATENT DOCUMENTS

| | | | |
|---|---|---|---|
| 2,073,998 | 3/1937 | Raby | 248/124 |
| 2,084,643 | 6/1937 | Johnson | 240/1.3 |
| 2,156,862 | 5/1939 | Maugard | 248/123 |
| 2,224,901 | 12/1940 | Cunningham | 248/123 |
| 3,352,521 | 11/1967 | Tyler | 248/123 |
| 3,613,546 | 10/1971 | Richardson | 396/428 |
| 3,638,502 | 2/1972 | Leavitt et al. | 74/5.34 |
| 3,788,585 | 1/1974 | Masseron | 248/178 |
| 4,838,117 | 6/1989 | Bittner | 74/665 C |
| 4,907,768 | 3/1990 | Masseron et al. | 248/123.1 |
| 5,054,725 | 10/1991 | Bucefari et al. | 352/243 |
| 5,124,938 | 6/1992 | Algrain | 248/550 |
| 5,184,521 | 2/1993 | Tyler | 352/243 |
| 5,289,090 | 2/1994 | Miller et al. | 396/428 |

*Primary Examiner*—D. Rutledge
*Attorney, Agent, or Firm*—Lyon & Lyon LLP

[57] ABSTRACT

A new circuit is connected to the pan servo amplifier 38 of a camera remote pan head 44 for the purpose of eliminating the need for manual backpan. The circuit comprises a tachometer 20 mounted on the pan arm of a camera crane or jib arm 28 and connected to switch 32 and potentiometers 34 and 36. The switch and potentiometers select between three options for operation: an off position, a one to one reverse correspondence between the panning movement of the crane arm 28 and the panning movement of the pan head 44, and a variable reverse correspondence between the panning movement of the crane arm 28 and the panning movement of the remote pan head 44.

The output is summed to a servo amplifier 38 which drives the remote head pan motor/tachometer 40. A number of means for alternative implementation are also suggested.

12 Claims, 7 Drawing Sheets

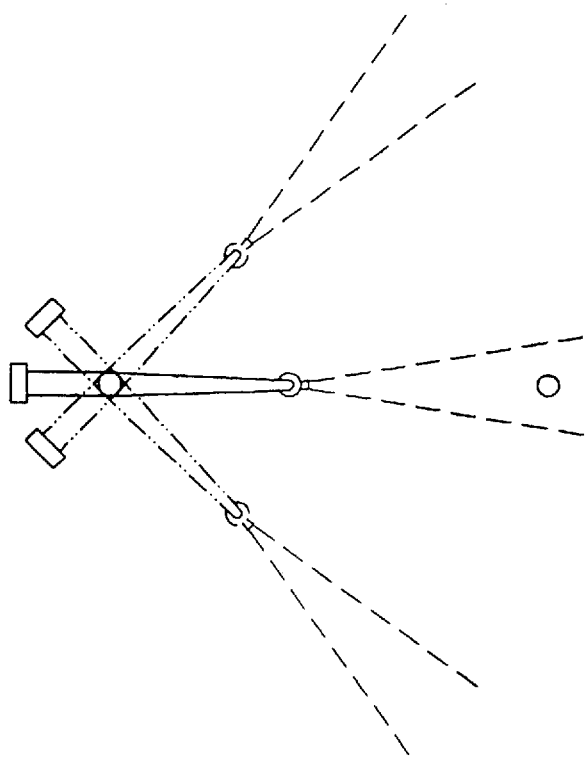
Fig. 1-A
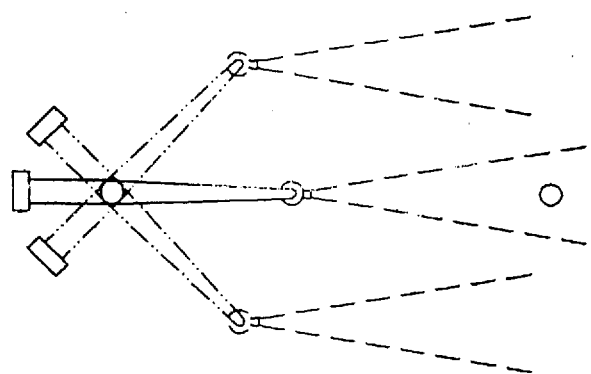
Fig. 1-B
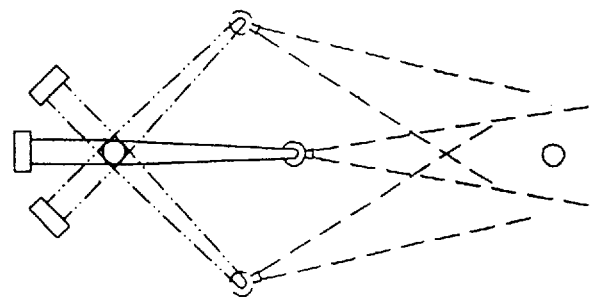
Fig. 1-C

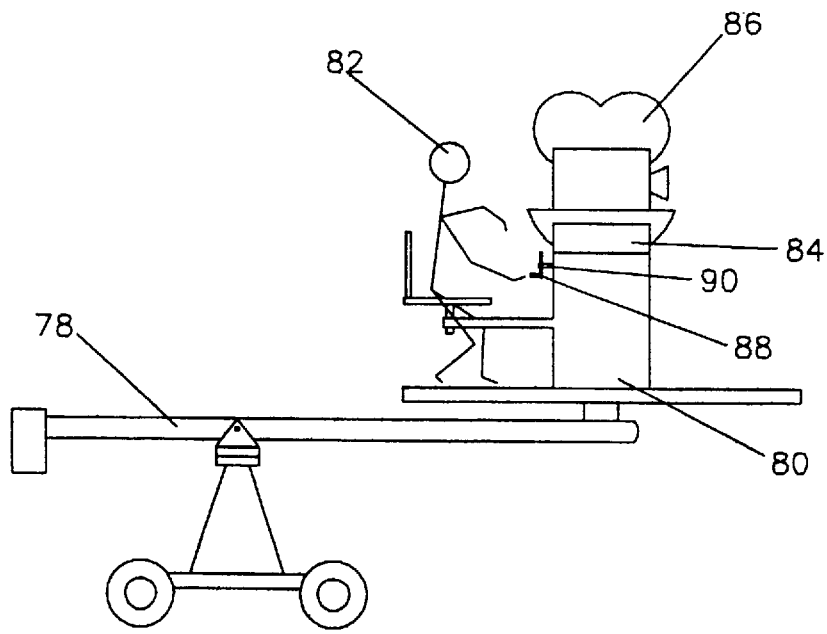
Fig. 6-A
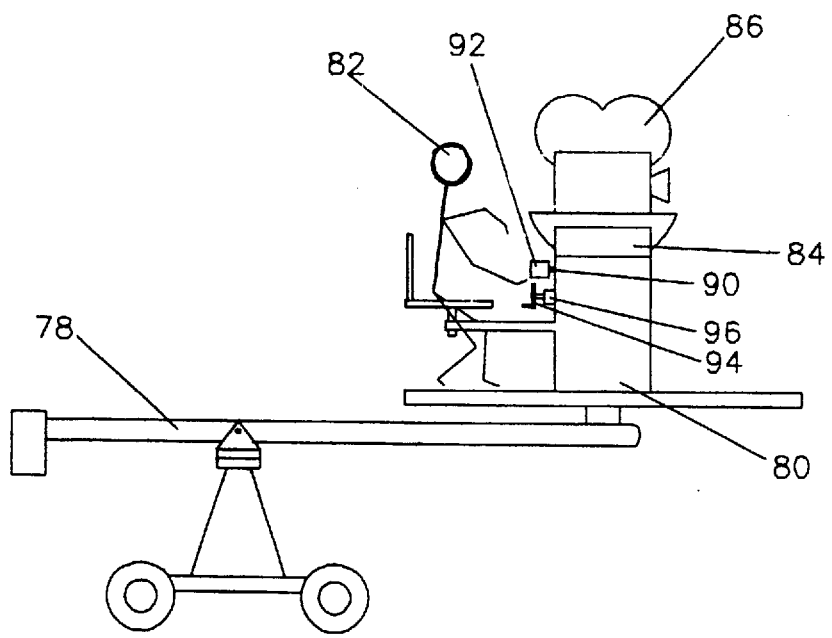
Fig. 6-B

COMPENSATION MECHANISM FOR THE ELIMINATION OF MANUAL BACKPAN ON CAMERA CRANES AND JIB ARMS

This is a continuation of co-pending application Ser. No. 08/476,459 filed Jun. 7, 1995, U.S. Pat. No. 5,644,377.

BACKGROUND—FIELD OF INVENTION

The invention relates to crane or jib arms used for live action motion picture or television production, specifically to a method of automatically compensating for camera backpan.

BACKGROUND—DESCRIPTION OF PRIOR ART

When a camera is mounted at the end of a crane or jib arm and swung through space without the operator making any correction, the lens pans through space as shown in FIG. 1a. If it is desired that the camera remain pointed at a fixed compass position in space as the arm is panned in an arc, as shown in FIG. 1B, the camera operator must make a compensating reverse pan of the camera perfectly matched to the speed and direction of the arm. This process is known as backpan. Generally, only operators skilled and practiced at this maneuver can accomplish it perfectly and they require several rehearsals with the operator of the arm to synchronize their respective movements. Any error by the camera operator results in the camera panning away from the desired composition often followed by an overcompensating pan as the camera operator attempts to correct. This movement is called fishtailing. Both faulty composition and fishtailing result in additional retakes at significant cost to the production company.

Before the introduction of remote camera heads, when a camera was mounted on a crane or jib arm, the operator rode with it. Consequently, as the arm began to swing, the operator sensed its movement immediately and made a rapid correction to compensate for the arm's swing.

With the introduction of remote control camera heads for motion picture and television production, the operator was stationed at a distance from the crane and thus lost the ability to feel its movement. Since the operator was no longer riding the crane, the operator's first knowledge of any change in speed or direction came from seeing the composition slip away on the monitor screen, too late to make a timely correction.

OBJECTS AND ADVANTAGES

Accordingly, several objects and advantages of my invention are: totally automatic correction of backpan, perfectly synchronized with the movement of a crane arm or jib even in the event of unplanned or unrehearsed movements of the arm. Further, by incorporating a ratio adjustment which allows the operator to overcompensate the pan of the head in relation to the pan of the crane arm, the camera can be made to point at an object in near space as the arm swings, as shown in FIG. 1C. This overcompensation or "Autopointing" is of great benefit to the camera operator since it causes the camera to remain centered on any stationary actor or object without effort on the operator's part. Further, by undercompensating the pan of the head in relation to the pan of the crane arm, the camera can be made to backpan at a slower speed than the arm for artistic purposes.

An important feature of the backpan compensator is that it can be turned off or on or the compensation ratio can be varied as desired during the shot. All this is accomplished without losing the intended functional capability of the remote pan head. Still further objects and advantages will become apparent from a consideration of the ensuing description and accompanying drawings.

BRIEF DESCRIPTION OF THE DRAWINGS

FIG. 1a is a top plan view showing the field of view of a camera without backpan compensation.

FIG. 1b is a top plan view showing the field of view of a camera with one to one reverse backpan compensation.

FIG. 1c is a top plan view showing the field of view of a camera with variable backpan compensation tracking a fixed object.

FIG. 6a is a side plan view showing a turret operated crane.

FIG. 6b is a side plan view showing the invention installed on a turret operated crane.

Figure 2:
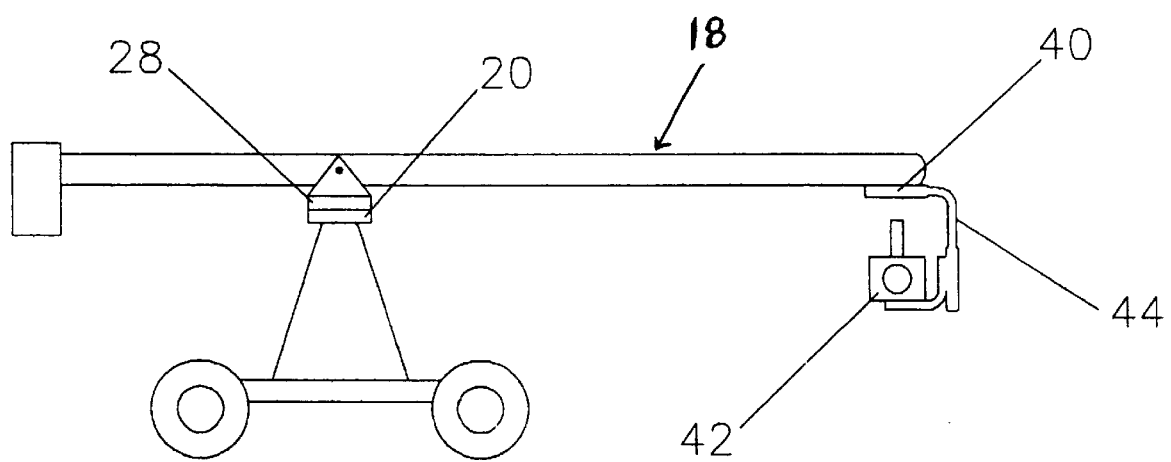
FIG. 2 is a side plan view showing the invention installed in a typical camera crane with remote head.

| Reference Numerals in Drawings | |
|---|---|
| 18 existing crane | 66 switch |
| 20 tachometer | 68 preset potentiometer |
| 22 control input | 70 servo amplifier |
| 28 pan arm of crane | 74 camera |
| 32 switch | 76 summing node |
| 34 preset potentiometer | 78 existing crane |
| 36 variable pot | 80 rotating turret |
| 38 servo amplifier | 82 camera operator |
| 40 pan motor/tachometer | 84 camera pan head |
| 42 camera | 86 camera |
| 44 remote pan head | 88 hand wheel |
| 46 summing junction | 90 shaft |
| 48 Remote pan Head | 92 motor/tachometer |
| 50 crane arm | 94 new hand wheel |
| 52 fixed element | 96 tachometer |
| 54 rotating element | 98 servo amplifier |
| 56 gear ring | 100 switch |
| 58 axle | 102 preset potentiometer |
| 60 motor/tachogenerator | 104 variable potentiometer |
| 62 gear | 106 gyroscope |
| 64 gyro sensor | |

DESCRIPTION—FIGS. 1 to 7

PREFERRED EMBODIMENT—DESCRIPTION

Figure 3:
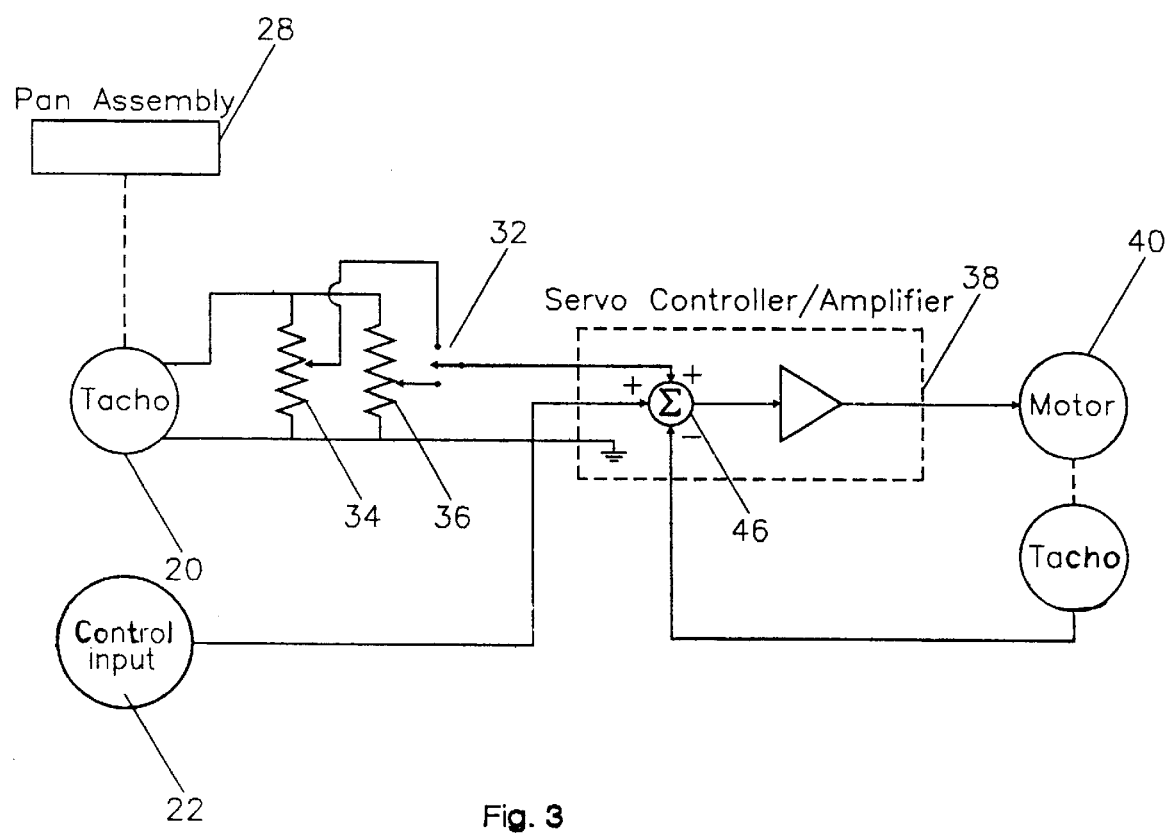
FIG. 3 is an electronic block diagram showing the connection of the invention to the remote head electronics.

A typical embodiment of the invention implemented on an existing crane 18 is illustrated in FIG. 2 (side plan view) and FIG. 3 (block diagram). A tachometer 20 such as the Inland Motor TG-2138, is mounted to a pan arm of crane 28 in such fashion that any panning motion of the arm generates an output. The output of tachometer 20 is routed through a three-position switch 32 which the operator uses to select between off, a preset potentiometer 34, or a variable potentiometer 36. This output is connected to a servo amplifier 38 such as the Axodyn series 05 which drives a pan motor/ tachometer 40 for example PMI model U9M4/U6T used to pan a camera 42 mounted on a remote pan head 44. Referring to the block diagram, FIG. 3, when pan arm 28 rotates, tachometer 20 produces an electrical signal which is carried through either preset potentiometer 34 or variable potentiometer 36 to switch 32 and then to a summing junction 46 included in servo 38. Through judicious selection of tachometer 20 output and amplifier 38 gain, sufficient drive exists so that, when potentiometer 36 is turned all the way up, pan motor 40 can drive camera 42 at a greater angular rate than pan arm 28. A control input 22 provides the operator with a means to pan camera 42 independently.

PREFERRED EMBODIMENT—OPERATION
FIG. 3

To operate the backpan compensator in the fixed mode it is only necessary to set switch 32 to the fixed position. Preset potentiometer 34 sets the gain of the system so that the compensating arc of remote pan head 44 is in one to one reverse correspondence with the angular panning motion of arm 28. To operate the backpan compensator in the variable mode switch 32 is set to the variable position. Then while arm 28 is panned back and forth variable potentiometer 36 is adjusted to provide the desired amount of compensation. It is quite feasible to vary this control during the shot if desired. For instance, if the director wants the camera to arc uncompensated through the first portion of the shot so as to "discover" an actor but then to have the crane arc back while the camera is compensated to keep the actor centered, the operator need only turn down variable potentiometer 36 during the first portion of the shot. At the appropriate moment variable potentiometer 36 is advanced the required amount and the automatic compensator takes over the job of backpan.

OTHER EMBODIMENTS

STAND-ALONE BACKPAN COMPENSATOR—
DESCRIPTION

Figure 4:
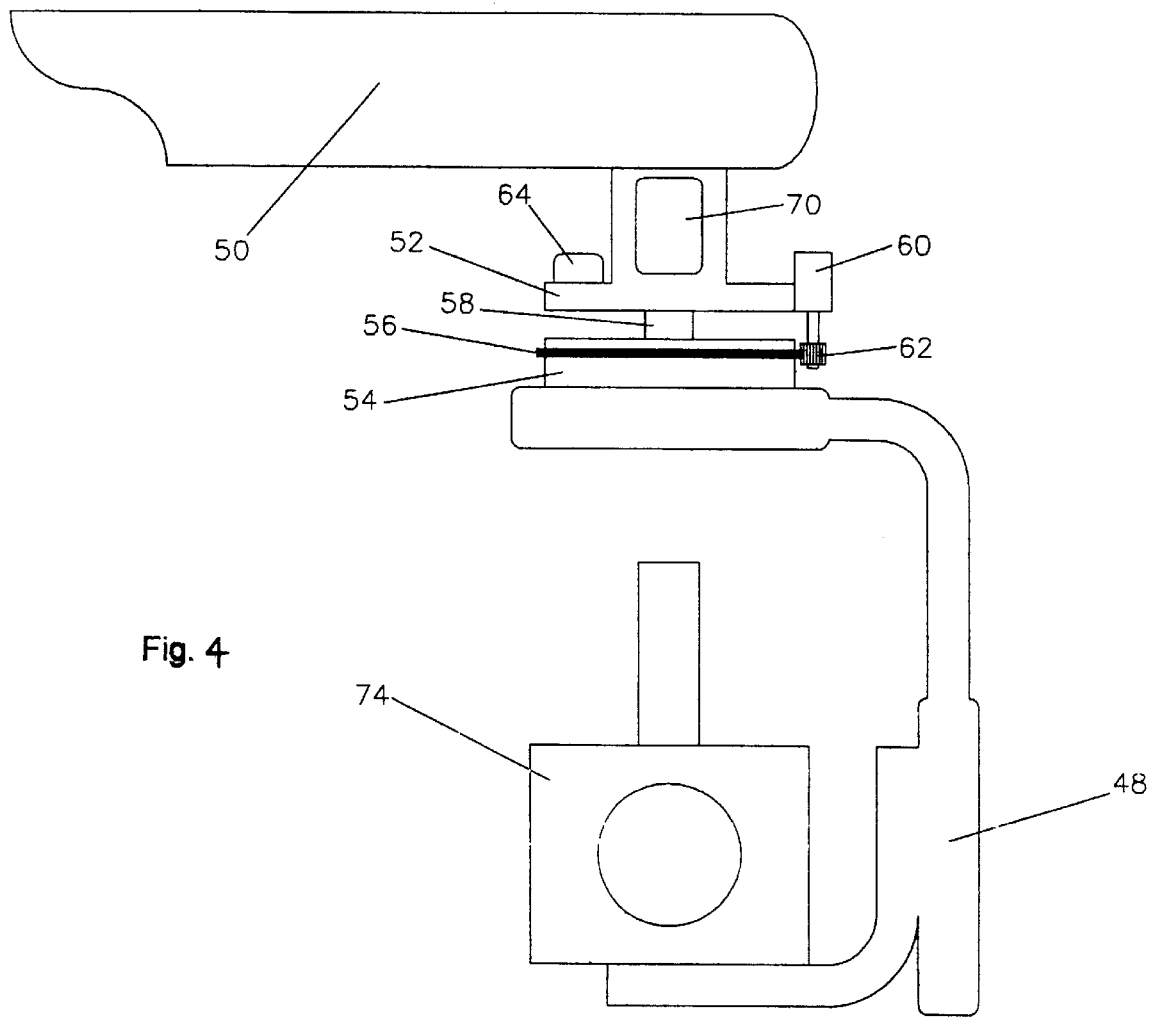
FIG. 4 is a side plan view of a stand-alone backpan compensator.
Figure 5:
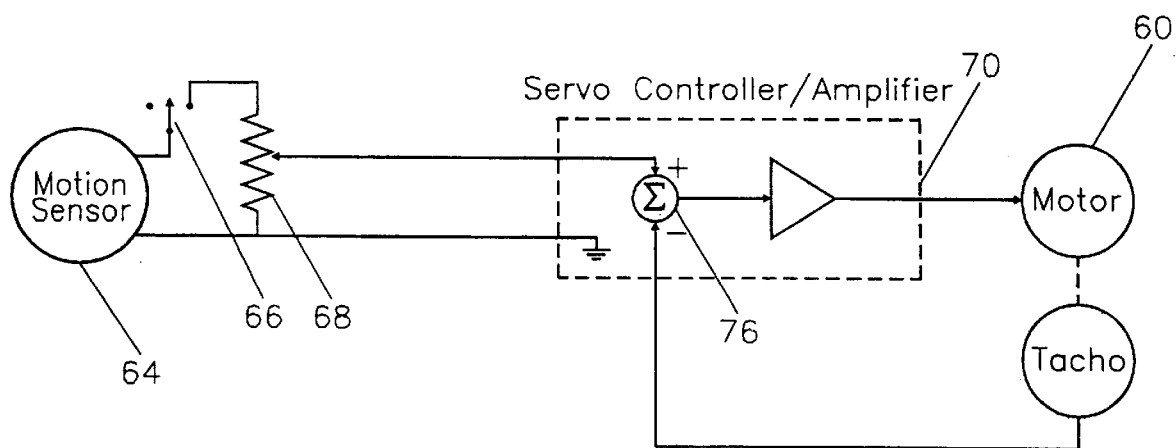
FIG. 5 is an electronic block diagram showing the connection of the invention as a stand-alone backpan compensator.

An additional embodiment shown in FIG. 4 (side view) and FIG. 5 (block diagram) would be interposed between currently available remote pan heads 48 which do not offer backpan compensation and a crane arm 50. It would provide stand-alone backpan compensation. In a simple form this embodiment would consist of a fixed element 52 attached to the camera head attachment point of crane arm 50. A rotating element 54 with a gear ring 56 fixed to the outer radius is held relative to fixed element 52 by means of axle 58. A motor/tachogenerator 60 secured to fixed element 52 and capable of driving rotating element 54 through a gear 62. A gyro sensor 64 is located on fixed element 52 and connected through switch 66 and preset potentiometer 68 to a servo amplifier 70 also located on fixed element 52. The output of servo amplifier 70 drives motor/tachogenerator 60. Remote pan head 48 with attached camera 74 are attached to and driven by rotating element 54.

STAND-ALONE BACKPAN COMPENSATOR—
OPERATION

When switch 66 is turned on the output of gyro sensor 64 flows through potentiometer 68 to the summing node 76 of servo amplifier 70 where it is summed with the output of motor/tachogenerator 60. When potentiometer 68 has been properly adjusted the result will be a one to one reverse correspondence between the angular motion of crane arm 50 and the pan of rotating element 54 keeping camera 74 aimed at a fixed compass point.

BACKPAN COMPENSATOR FOR TURRET
OPERATED CRANES—DESCRIPTION

Figure 7:
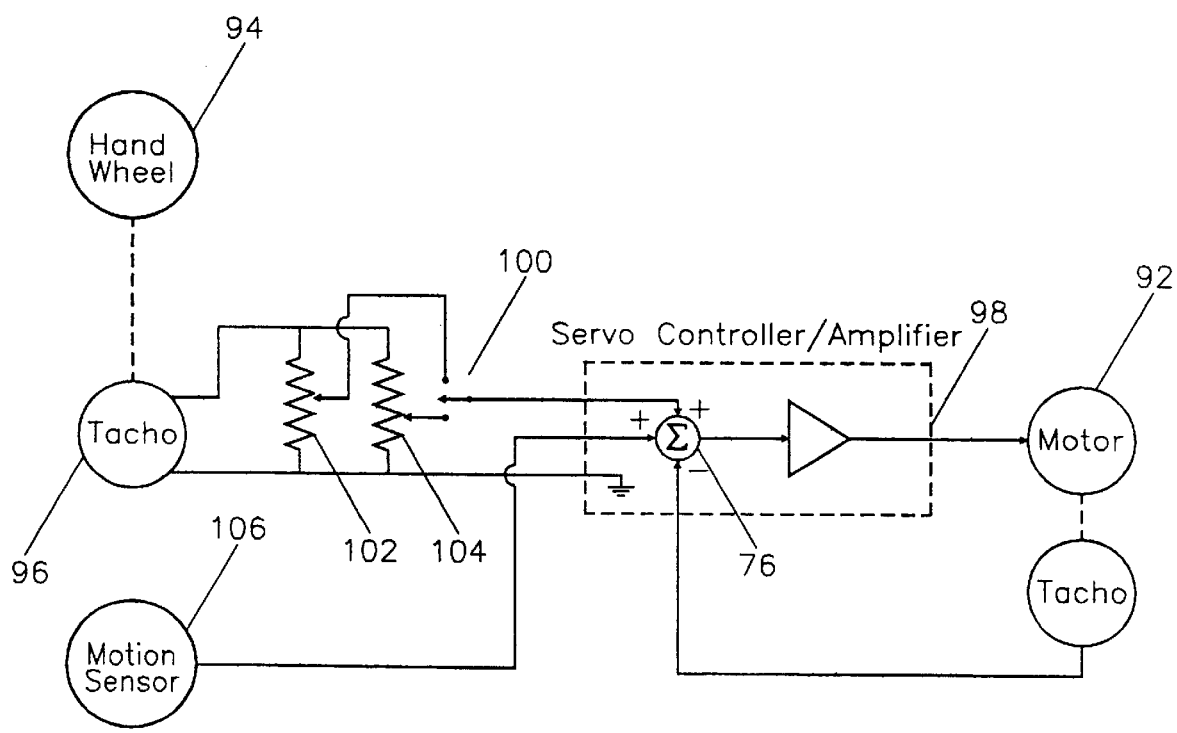
FIG. 7 is an electronic block diagram showing the connection of the invention as a backpan compensator for a turret operated crane.

An additional embodiment shown in FIG. 6b (side view) and FIG. 7 (block diagram) could be fitted to large existing camera cranes 78 which utilize a rotating turret 80. Shown in FIG. 6a this type of crane, turret 80 which carries camera operator 82 a hand operated camera pan head 84 and a camera 86 is rotated by the operator using a hand wheel 88 fixed to a shaft 90 which is connected to and drives additional existing mechanism as necessary to rotate turret 80. In this embodiment a motor/tachogenerator 92 is fixed to shaft 90 replacing original hand wheel 88. A new hand wheel 94 turning a tachometer 96 or similar device and attached as desired to a point convenient to operator 82 is connected to servo-amplifier 98 through switch 100 and Preset potentiometer 102 or variable potentiometer 104 where it is summed with the output from a motion sensor such as a gyroscope 106 and the tacho output of motor/tachometer 92.

BACKPAN COMPENSATOR FOR TURRET
CRANES—OPERATION

In this Embodiment motor/tachometer 92 would be fixed in place of the original operator hand wheel 88. New hand wheel 94, fixed conveniently for the operator, turns tachometer 96. The output of tachometer 96 is summed into servo amplifier 98 along with the output of Gyro 106 and the tacho output of motor/tachometer 92. This embodiment preserves operator freedom to choose between panning the whole turret or camera only. It provides for rotation of the turret without the physical effort by the operator associated with turning the turret by purely mechanical means.

SUMMARY, RAMIFICATIONS AND SCOPE

Accordingly the reader will see that the compensator provides automatic compensation of backpan for cameras used in live action photography and operated by means of remote heads. Additionally, it affords the operator greater creative control by permitting automatic overcompensation, under compensation and variable compensation of backpan during the shot. The turret crane embodiment provides the additional advantage of reducing the effort necessary for operation of the turret.

Although the description above contains many specificities these should not be construed as limiting the scope of the invention but as merely providing illustrations of some of the presently preferred embodiments of this invention. Various other embodiments and ramifications are possible within it's scope. For example, in the main embodiment although tachometer 20 is specified, a Gyroscope, encoder, potentiometer, accelerometer or other commonly available motion sensing device can be substituted with minor changes to the electronic circuit familiar to anyone versed in the art. Similarly the mounting of the motion sensor is not limited to the method described. For instance, the motion sensor may be gear, belt, shaft or similarly driven or it may be mounted on the radius of the pan assembly instead of at the center. Another embodiment would use optical encoding marks scribed or fixed to one side of the pan assembly and sensors fixed to the other. Hall effect sensors and magnets affixed similarly could also provide a suitable output. If a gyroscope is used to generate the reference signal then the sensor can be located anywhere on the arm or on the head itself.

Although the embodiment as shown is connected to analog servo amplifier 38 the method would work just as well with P.W.M. or digital implementations.

The embodiment as shown utilizes tachometer feedback from pan motor/tachometer 40 to close the loop between it and servo amplifier 38. Other versions might accomplish the same end using digital encoders, or other commonly available means. It is also possible to construct the backpan compensator using current feedback from motor 40 instead of the tachometer output or even to imagine a version without feedback of motor position at all although in these cases spatial and temporal accuracy would probably suffer. Similarly motor/tacho 40 might be replaced by a motor and motion sensor mounted separately but functioning as described above.

The function of potentiometers 34 and 36 can be effected by any common means including but not limited to digital potentiometers, microprocessor control or switch able resister networks.

Another version might be constructed offering only a fixed one to one correspondence between the angular motion of arm 28 and head 42 by omitting variable potentiometer 36.

Similarly, in the stand alone version Although Gyro sensor 64 is specified, a tachometer, encoder, potentiometer, accelerometer or other commonly available motion sensing device can be substituted with minor changes to the electronic circuit familiar to anyone versed in the art. The mounting of the motion sensor is not limited to the method described. The gyroscope used to generate the reference signal can be located anywhere on the arm 50 or on remote pan head 48. Also motor/tachometer 60 can be replaced by a separate motor and tachometer or other motion sensor. Although the embodiment described uses gears to rotate the moving element a direct drive motor can be substituted to perform the function.

Thus the scope of the invention should be determined by the appended claims and their legal equivalents, rather than by the examples given.

What is claimed is:

1. A system for automatically compensating for arc of a camera when panned on a crane arm or jib comprising:
    a motor for panning the camera;
    a controller for controlling said motor;
    a sensor located on said arm or jib, for sensing angular pan movement of said arm or jib and for providing a signal to said controller;
    wherein the controller compensates for the angular pan movement of said arm or jib by panning said camera in a reverse direction relative to the angular pan movement.

2. A system according to claim 1, further including a means for adjusting an amount by which the controller compensates for the angular pan movement.

3. A system according to claim 2 wherein the amount by which the controller compensates is adjustable while filming.

4. A system according to claim 1 wherein the sensor is selected from the group consisting of: a gyroscopic sensor, a tachometer, a potentiometer, an accelerometer, an encoder, a Hall effect sensor, a magnetic sensor.

5. A method for compensating for arc of a camera mounted on a support arm experienced during angular panning movement of the support arm, comprising the steps of:
    sensing angular panning velocity at the support arm and producing a first signal corresponding thereto;
    controlling panning position of the camera relative to the support arm by automatically panning the camera in a reverse direction relative to the support arm in a desired proportion to the first signal.

6. A method according to claim 5 further comprising adjusting the proportion by which the position of the camera is panned relative to the panning of the support arm to under or over compensate for the panning of the support arm.

7. An automatic backpan system comprising:
    a crane including a base and a horizontally rotatable crane arm pivotally connected thereto;
    a first sensor sensing angular velocity of the crane arm relative to the base;
    a camera head pivotally mounted to one end of the crane arm such that the camera head is horizontally rotatable with respect to the crane arm;
    a camera head motor connected to the crane arm for horizontally rotating the camera head with respect to the crane arm;
    a controller connected to the camera head motor for controlling rotation of the camera head to rotate in a direction opposite to the rotation of the crane arm at a velocity in selected proportion to the angular velocity of the crane arm relative to the base.

8. An automatic backpan system according to claim 7 further comprising
    a second sensor for producing a second signal corresponding to the angular velocity of the crane arm relative to the camera head and wherein the first sensor produces a first signal corresponding to the angular velocity of the crane arm relative to the base.

9. An automatic backpan system according to claim 8 further comprising
    a servo amplifier accepting as inputs at least the first signal and the second signal and producing as output a third signal which controls the angular velocity of the motor, wherein the third signal is proportional to the difference between the second signal and the sum of all other input signals.

10. An automatic backpan system according to claim 9 wherein a control signal is accepted by the servo amplifier as an input, the control signal being controllable by a user of the system.

11. An automatic backpan system according to claim 7 wherein the first and second sensors are selected from the group consisting of: gyroscopic sensors, tachometers, potentiometers, accelerometers, encoders, Hall effect sensors, magnetic sensors.

12. An automatic backpan system according to claim 7 further comprising a switch for selecting between (1) a first operational mode in which the camera head is fixed relative to the crane arm, (2) a second mode in which the camera head is rotated in a direction opposite to the rotation of the crane arm at a velocity in selected proportion to the angular velocity of the crane arm relative to the base wherein the selected proportion is fixed during rotation of the crane arm, and (3) a third mode in which the camera head is rotated in a direction opposite to the rotation of the crane arm at a velocity in selected proportion to the angular velocity of the crane arm relative to the base wherein the selected proportion is variable during rotation of the crane arm.

* * * * *